Patented Oct. 17, 1950

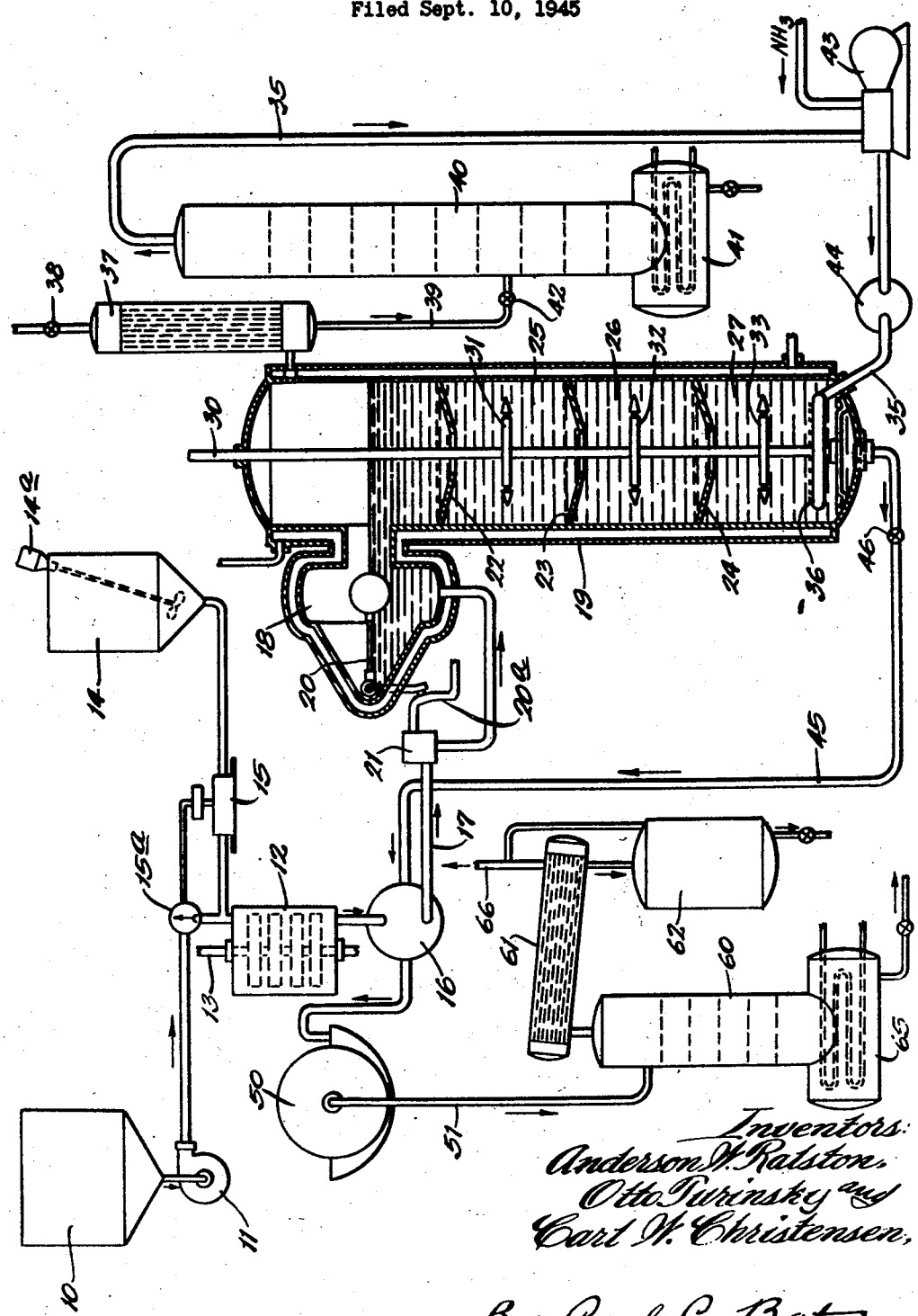

2,526,044

UNITED STATES PATENT OFFICE 2,526,044

MANUFACTURE OF NITRILES

Anderson W. Ralston, Chicago, Otto Turinsky, Palatine, and Carl W. Christensen, Hinsdale, Ill., assignors to Armour and Company, Chicago, Ill., a corporation of Illinois Application September 10, 1945, Serial No. 615,354

15 Claims. (Cl. 260—97.5)

This invention relates to nitriles and processes for their preparation. More particularly the invention deals with the catalytic reaction of polyene high molecular weight acids with ammonia to produce polynitriles.

Saturated and monounsaturated polynitriles have been prepared by first reacting fatty acids with ammonia to produce nitriles and then heating the nitriles to polymerize them. The reaction of the acids and ammonia has been conducted by passing vaporous fatty acids and gaseous ammonia over a dehydrating catalyst at from 300° to 400° C., the catalyst being aluminum oxide, silica gel or other known dehydrating catalysts. Another method which has been used for producing the fatty acid mononitriles is by reaction of the fatty acids in liquid phase with gaseous ammonia at 250° to 350° C., the process being illustrated by Ralston et al. Patent No. 2,061,314.

The polymerization of nitriles, produced as above explained, has been accomplished by heating the nitriles until bodying takes place. In some instances catalysts such as aluminum chloride have been used and the polymerization conducted in a solvent, it being probable that the solvent enters into the reaction.

However, these procedures have not permitted the production of polynitriles of polyene fatty acids. This is explained by the fact that the high molecular weight acids are very heat sensitive. The unsaturated acids are more heat sensitive than the saturated acids, and the polyenic acids are much more heat sensitive than the monoenic acids. In all previous processes for producing polynitriles, the reaction of the acids and ammonia by the processes heretofore utilized have required such stringent conditions of time and temperature that the polyenic acids decompose and combine in a complex manner and are recovered from the nitrile producing process in the form of pitch. Therefore, the nitriles which have heretofore been subjected to polymerization have not included polyene nitriles, and in the reaction of fatty acid and ammonia to produce nitriles no fatty acid stock containing any substantial amount of polyene acids has been used.

We have now discovered an improved process for reacting the high molecular weight acids with ammonia, and it is an important feature of our process that when we start with polyene acids the resulting nitrile product is substantially polymeric.

Our improved process involves the reaction of the high molecular weight acids with ammonia in the presence of phosphorus as a catalyst. This enables the production of polynitriles of high molecular weight polyene fatty acids. Furthermore, the process requires only one operation in contrast to the two procedures (reaction to produce nitriles and heat treatment to polymerize) which were previously required in polynitrile preparation.

In carrying out our process the phosphorus catalyst may be mixed with the liquid acids and the mixture heated while ammonia gas is passed therethrough. The reaction may be carried out in a batch or by a continuous process. Whether the process be carried out in a batch or a continuous process, we find that it is important to employ mechanical agitation during the reaction.

Following are specific examples in which polynitriles of polyene acids are prepared:

Example 1

A mixture of 600 parts of dehydrated castor oil fatty acids and 1.2 parts of red phosphorus was heated in a flask equipped with a short reflux while a moderate stream of ammonia gas was bubbled through the liquid. The temperature was maintained at 310° to 315° C. for a period of 3.5 hours and the amount of water obtained from the reaction was found to be practically theoretical for nitrile formation. The reaction mixture was cooled in an atmosphere of ammonia and then filtered to remove the red phosphorus. The monomeric nitriles were then removed by subjecting the reaction mixture to vacuum distillation at 0.5 mm. pressure and 160° to 165° C., the monomers appearing in the distillate and the polymers in the residue. This polymerized product was a clear, amber colored, light bodied liquid which was essentially odorless. The color expressed in terms of the Lovibond scale was 35Y, 5R for a 1¼ inch column. The yield of polynitrile was 68% on the basis of the total theoretical yield of nitriles. The free acid was found by titration to be 0.0 in both the polymer and the distillate. The polynitriles were readily soluble in cold hydrocarbon solvents and in warm ethyl alcohol; however, they separated from the latter solvent on cooling.

Example 2

A mixture of 80.8 parts of castor oil fatty acids and 0.2 part of red phosphorus was heated at 310° to 315° C. for 3.5 hours in a stream of ammonia. The product was then treated as described in Example 1. The yield of polynitrile was 69.7% on the basis of the total theoretical yield of nitriles. The color of the polynitriles was 35Y, 10.3R on the Lovibond scale. Neither the polymer nor the monomer contained any free fatty acids, showing that nitrile formation was quite complete.

Example 3

The procedure of Example 2 was followed using dehydrated castor oil acids. A polynitrile product was obtained which compared favorably in color and yield with the polynitrile of the untreated castor oil acids of Example 2.

Example 4

A mixture of 79.4 parts of linseed oil fatty acids and 0.1 part of red phosphorus was processed as described in Example 1. A 72% yield of polynitrile was obtained which resembled that obtained in Example 1 with the exception that it was not quite so light in color, the color being read as 35Y, 13.5R on the Lovibond scale using a 1¼ inch column. No free acid was found in either the polymer or the monomer.

Example 5

A mixture of 74.9 parts of distilled soyabean fatty acids and 0.2 part of red phosphorus was processed as described in Example 1. The residue of polynitriles was a clear, reddish amber, the color being 100Y, 27R on the Lovibond scale using a 1¼ inch column. This product was a lightly bodied oily liquid. The yield of polymer was 29% on the basis of the total theoretical yield of nitriles. Free acids were absent from both the polymer and distillate fractions.

Example 6

A mixture of 521 grams of dehydrated castor oil fatty acids and 1 gram of red phosphorus was heated with ammonia gas in a 3 neck flask equipped with a motor stirrer and a short reflux condenser. A moderate stream of ammonia gas was introduced near the bottom of the flask through a small glass tube provided with a sintered glass tip. The mixture was stirred constantly while the heat was applied. The temperature was raised to 320° C. and held at this temperature for 45 minutes, then raised to 340° C. and held for 35 minutes, and was finally raised to 350° C. and held for 25 minutes. The loss in weight was found to be 75.5 grams. (The calculated weight loss required for complete conversion to the nitrile is 35.3 grams.) The quantity of water obtained from the reaction corresponded very closely with the calculated amount required for nitrile formation. After cooling to room temperature in an atmosphere of ammonia, the red phosphorus was filtered off and the filtrate heated under a vacuum of .5 mm. pressure to remove any monomeric nitriles. Very little distillate was obtained at 150° to 160° C., which is the approximate distilling range of the monomeric nitriles. The distillation temperature was brought up to 190° C. but still there was very little tendency for any product to distill. The residue obtained was a pale, clear and very lightly bodied liquid which was readily soluble in 95% ethyl alcohol and contained less than 0.2% free fatty acids.

According to our discoveries the phosphorus catalyzes the reaction between the acid and ammonia whether the acid be saturated, monoenic or polyenic, and in addition drives the reaction toward the polymeric form of product wherever the acid involved is polyenic.

Our invention deals particularly with the treatment of high molecular weight acid in the nitrile reaction using phosphorus as a catalyst, the term "high molecular weight" being understood to mean that the compound contains six or more carbon atoms in a hydrocarbon group. The high molecular weight acids which can be used in the reaction include the saturated and mono unsaturated fatty acids such as lauric, palmitic, stearic and oleic acids, and also the hydroxy acids. Typical of the polyene acids which may be used are the polyenic fatty acids such as linoleic, linolenic, ricinoleic and elaeostearic acids. Other polyenic acids which may be used are abietic acid and other rosin acids of tall oil. We may also use mixed acid stocks such as the acid obtained upon hydrolysis of linseed oil, cottonseed oil, soyabean oil, castor oil, or tall oil. When the acids used contain polyene acids it is possible to utilize the advantage of our improvements in the production of polynitriles. Advantageously, we may fractionate the natural acid mixtures obtained from linseed oil, soyabean oil or other natural source by a process of fractional distillation or fractional crystallization, to obtain an acid fraction which contains a higher proportion of polyene acids than is contained in the natural acid mixture, and then subject this fraction to reaction with ammonia using phosphorus as a catalyst.

We can use phosphorus in its various forms, but we prefer to use red or "amorphous" phosphorus. The white phosphorus is more volatile and is poisonous which makes it less desirable for use as such but it is easily converted to the "red" form by exposure to light.

Only a small amount of phosphorus need be used. We have found that for a maximum benefit it is usually necessary to incorporate phosphorus to the extent of about 0.2% or more by weight of the acid. Much smaller amounts of catalyst can be used to obtain a noticeable benefit, and much more than 0.2% can be used but usually to no special advantage.

Instead of starting with the acids, we can start with esters or anhydrides of the acids, and the reaction proceeds in the same manner. In these specifications and claims we use the term "acid material" to designate the acids, their esters or anhydrides. When we speak of nitriles of the acids this is intended to include also the nitriles formed through reaction of the acid anhydrides or acid esters with ammonia.

When we start with acid materials containing saturated or monoenic substances along with polyenic substances, the mono nitriles may be separated from the polynitriles by distillation. The polynitriles are substantially non-volatile, but they may be distilled in a molecular type still. The characteristic of extremely low volatility together with their other qualities makes these products excellent plasticizers for a number of synthetic resins and plastic materials.

Polynitriles may also be reacted with hydrogen in the presence of hydrogenating catalysts such as nickel and platinum to produce polyamines. In the hydrogenating process temperatures of 120 to 170° C. and pressures of the order of 50 to 500 lbs. per square inch may be employed. In this way the polynitriles of polyene acids may be converted to polyene polyamines which are also useful as plasticizers or modifiers in the resin or plastic fields. The polyamines may also be condensed with polycarboxylic acids to form polyamides which are useful as coating compositions. The polyamides of the polyamines formed by reaction of polynitriles of polyene acid materials are especially valuable products.

Suitable apparatus for carrying out our process in a continuous manner is illustrated in the drawing wherein the single figure shown is a schematic diagram or flow sheet.

Referring to the drawing, the acid material is drawn from any suitable source such as tank 10 and is pumped by the pump 11 through meter 15a into the mixing chamber 12 equipped with the agitator 13. A slurry, prepared by mixing phosphorus with acid material, is held in tank 14 and is maintained under agitation by the mixer 14a. This slurry is fed into mixer 12 by a proportioning pump 15. This pump may be of any suitable type for introducing the phosphorus slurry in the desired proportion to the acid being passed through meter 15a to the mixer.

The mixture of acid material and catalyst passing from the mixer 12 is fed into a heat exchanger 16 where it is heated almost to reaction temperature. The reaction temperature is of the order of about 310° to 350° C. for most stocks. The heated stock together with the catalyst passes through line 17 into the flow chamber 18 from which it passes into the reaction tower 19. The level control device 20 associated with the flow chamber controls the valve 21 in line 17 by means of the air line 20a to maintain the liquid in the flow chamber, and also the liquid in the reaction tower at a desired level irrespective of the rate at which material is withdrawn from the reaction tower. Any suitable means may be used for controlling valve 21 in accordance with the liquid level in the chamber to maintain a substantially uniform level.

Tower 19 and the flow chamber 18 are each jacketed so that a heat transfer medium may be circulated through the jacket to maintain the materials undergoing reaction at the desired temperature.

Preferably the tower 19 is provided with baffles 22, 23, and 24 which provide the reaction compartments 25, 26, and 27. The baffles each are downwardly inclined toward their centers and have central openings through which liquid materials may pass from one compartment to the other. Extending centrally through the tower is an agitator shaft 30 to which is attached the agitators 31, 32, and 33, adapted to serve compartments 25, 26 and 27 respectively. Any suitable power means may be used to rotate this shaft. The agitators 31, 32, and 33 are preferably of the turbine type and adapted to impel the liquid outwardly toward the sides of the tower.

Ammonia gas is introduced at the bottom of tower 19 through line 35 and sparger 36. The gas is mixed with acid material in compartment 27, contact with the acid material being aided by agitator 33. Unreacted gas passes upwardly through the tower being subjected to further agitation and reaction in compartments 25 and 26. Any unreacted ammonia reaching the top of the tower, along with water vapor generated as a result of the reaction and certain non-condensible gases, passes from the top of the reaction tower into the condenser 37. Non-condensible gases pass through the condenser and are exhausted to the atmosphere through expansion valve 38. The ammonia and water vapors are converted to aqueous ammonia which flows through the condenser through line 39, controlled by valve 42, into the fractionating column 40. In column 40 the water collects in the pot 41 from which it is discharged and ammonia vapors are taken off at the top of the column and re-introduced through line 35 through the reaction tower 19. Additional ammonia is added by the pump 43 to make up for that utilized in the reaction. Heater 44 is provided for preheating the ammonia being introduced to the tower.

It will be observed that the flow of acid material and ammonia through tower 19 is countercurrent, the acid material being passed downwardly while the ammonia is being passed upwardly. The acid material at the top of tower 19 is only partially reacted with ammonia in compartment 25, and therefore in this compartment there is only a small proportion of nitriles. Additional reaction takes place as acid materials pass through compartments 26 and 27 and the proportion of nitriles increases as the material progresses, the lowest proportion of unreacted material being greeted by the highest rate of ammonia flow, thus aiding to react the last traces of acid material in the mass.

The nitriles produced by the reaction, together with the phosphorus catalyst are withdrawn from the tower through line 45 controlled by valve 46, and are cooled by the incoming feed at exchanger 16. The nitriles and phosphorus mixture then pass to the continuous filter 50 where the phosphorus is filtered out and either discarded or returned for further use in the process.

The filtrate, which contains both monomer and polymer nitriles, may be delivered through line 51 to the vacuum distilling tower 60. The monomers being more volatile are passed as vapors to condenser 61 where the vapors are condensed and collected in receiver 62 from which they may be withdrawn as product. The water vapor and other uncondensed vapors are withdrawn through line 66. The polynitriles being of lower volatility collect in the pot 65 in the bottom of the stripping column from which they may be recovered as product. The bottom of tower 60 is in open communication with the pot 65.

By our process we can obtain a nitrile product which is generally in theoretical yields. We have found that by using our improved processes employing phosphorus as a catalyst we can produce a polynitrile product which is predominately dimer and which contains only very small amounts, if any, of the trimer and higher polymers. This is evidenced by the fact that the polynitrile product is soluble in ethyl alcohol.

The product is also light in color, making it more satisfactory for use in coating compositions. The higher quality of the product is believed to be due at least in part to the fact that the reaction is conducted in liquid phase and is accomplished in a much shorter period of time than has heretofore been possible in any liquid phase process for producing nitriles. Even where the reaction is conducted in a batch operation, the reaction by our improved process is completed in about one and one-half to three hours where without the catalyst about twenty hours are required to produce the same degree of acid conversion.

While we have described our invention in connection with certain specific modes of procedure, using specific starting materials, it is understood that many different materials may be used and

What we claim as invention and desire to secure in Letters Patent is:

1. In a process for preparing nitriles, the step of reacting a fatty acid material and ammonia in the presence of a phosphorus catalyst.

2. In a process for preparing nitriles, the step of reacting a high molecular weight acid material and ammonia in the presence of a phosphorus catalyst while mechanically agitating the reactants.

3. In a process for preparing nitriles, the steps of passing a mixture of liquid acid material and phosphorus catalyst continuously through a reaction zone while continuously passing gaseous ammonia through said zone.

4. In a process for preparing nitriles, the steps of passing a mixture of liquid acid material and phosphorus catalyst continuously through a reaction zone while continuously passing gaseous ammonia through said zone and while mechanically agitating the materials within said zone.

5. In a process for preparing nitriles, the steps of passing a mixture of liquid acid material and a phosphorus catalyst continuously through a reaction zone while continually passing gaseous ammonia through said zone, continuously withdrawing from said zone a mixture of nitrile and phosphorus and separating said phosphorus from said nitrile.

6. In a process for preparing nitriles, the steps of contacting gaseous ammonia with a mixture of acid material and phosphorus catalyst, and after the reaction to produce nitrile, separating said phosphorus from the nitrile so formed.

7. In a process for preparing nitriles, the steps of contacting gaseous ammonia with a mixture of castor oil acid material and phosphorus catalyst, and after the reaction to produce nitriles, separating said phosphorus from the nitrile so formed.

8. In a process for producing nitriles, the steps of contacting gaseous ammonia with a mixture of linseed oil acid material and phosphorus catalyst, and after the reaction to produce a nitrile separating said phosphorus from the nitrile so formed.

9. In a process for producing nitriles, the steps of contacting gaseous ammonia with a mixture of soyabean oil acid material and phosphorus catalyst, and after the reaction to produce nitrile, separating said phosphorus from the nitrile so formed.

10. In a process for producing polynitriles, the steps of contacting gaseous ammonia with a mixture of acid material having at least two double bonds and an acid material having less than two double bonds with a phosphorus catalyst, and after the reaction takes place separating the polynitrile formed as a result of the reaction of the two or more double bonds acid material from the nitriles formed as a result of the reaction of the remaining acid material.

11. In a process for preparing polynitriles, the steps of mixing a phosphorus catalyst with an acid material, said acid material including polyene radicals and radicals having less than two double bonds, passing the mixture of acid material and phosphorus in liquid phase through a reaction zone while passing gaseous ammonia through said zone and into contact with said acid material and phosphorus, withdrawing from said zone a mixture of polynitrile, mononitrile and phosphorus, filtering said nitrile and phosphorus mixture to remove the phosphorus and subjecting the resulting nitrile mixture to distillation to separate the mononitrile from the polynitrile, the material being subjected to process being passed in a continuous moving stream throughout each of said steps.

12. The process, as set forth in claim 11, including withdrawing from said reaction zone excess ammonia and water of reaction, separating said ammonia from said water of reaction, and returning the ammonia to the reaction zone.

13. In a process for producing nitriles, the steps of contacting ammonia with liquid acid material in the presence of a phosphorus catalyst and as the reaction proceeds separating from the reactants the water of reaction in vaporous form.

14. In a process for preparing a polynitrile, the step of reacting a polyene acid material and ammonia in the presence of a phosphorus catalyst.

15. In a process for producing nitriles, the step of reacting a high molecular weight fatty acid selected from the group consisting of saturated and mono unsaturated fatty acids with ammonia in the presence of a phosphorus catalyst.

ANDERSON W. RALSTON.
OTTO TURINSKY.
CARL W. CHRISTENSEN.

REFERENCES CITED

The following references are of record in the file of this patent:

UNITED STATES PATENTS

| Number | Name | Date |
| --- | --- | --- |
| 2,023,337 | Nicodemus et al. | Dec. 3, 1935 |
| 2,130,523 | Carothers | Sept. 20, 1938 |
| 2,162,971 | Ralston | June 20, 1939 |
| 2,175,092 | Ralston | Oct. 3, 1939 |
| 2,273,633 | Fluchaire et al. | Feb. 17, 1942 |
| 2,314,894 | Potts et al. | Mar. 23, 1943 |
| 2,380,531 | Jolly | July 31, 1945 |
| 2,388,034 | Biggs | Oct. 30, 1945 |